United States Patent [19]

Utsumi

[11] Patent Number: 4,756,953

[45] Date of Patent: Jul. 12, 1988

[54] UNIAXIALLY HIGH-ORIENTED POLYETHYLENE NAPHTHALATE FILM FOR POLARIZING PLATES

[75] Inventor: Shigeo Utsumi, Yokohama, Japan

[73] Assignee: Diafoil Company, Limited, Tokyo, Japan

[21] Appl. No.: 934,797

[22] Filed: Nov. 25, 1986

[30] Foreign Application Priority Data

Dec. 9, 1985 [JP] Japan .............................. 60-276645

[51] Int. Cl.$^4$ ............................................. B32B 27/36
[52] U.S. Cl. ..................................... 428/220; 428/480
[58] Field of Search ........................... 428/480, 220, 1

[56] References Cited

U.S. PATENT DOCUMENTS 4,198,458  4/1980  Mitsuishi et al. .................. 428/480

FOREIGN PATENT DOCUMENTS 58-124621  7/1983  Japan ................................. 428/480
58-125002  7/1983  Japan ..................................... 428/1
60-134204  7/1985  Japan ................................. 428/480

Primary Examiner—Thomas J. Herbert
Attorney, Agent, or Firm—Oblon, Fisher, Spivak, McClelland & Maier

[57] ABSTRACT

A uniaxially high-oriented polyethylene naphthalate film for polarizing plates which contains a dichroic dyestuff, having an in-plane birefringence or more than 0.110 after the film is stretched and subjected to heatset treatment.

13 Claims, No Drawings

UNIAXIALLY HIGH-ORIENTED POLYETHYLENE NAPHTHALATE FILM FOR POLARIZING PLATES

BACKGROUND OF THE INVENTION

The present invention relates to a uniaxially high-oriented polyethylene naphthalate film for polarizing plates and, in particular, to a film suitable for a polarizing plate which is excellent in heat resistance and weather resistance. More particularly, the present invention relates to a polyethylene naphthalate film useful as a polarizing plate, which is stretched uniaxially with high orientation, contains a dichroic dyestuff, and shows an in-plane birefringence of more than 0.110 after the film is stretched and subjected to heatset treatment.

Uniaxially stretched polyethylene terephthalate films containing a dichroic dyestuff have conventionally been used as polarizing plates having good mechanical properties, electrical properties and heat resistance.

A uniaxially stretched polyethylene terephthalate film, however, has been found to have various defects as it has increasingly been used for wide purposes, and an improvement has been demanded. For example, when a uniaxially stretched polyethylene terephthalate film containing a dichroic dyestuff is used as a polarizing plate, the dye which is capable of enhancing the degree of polarization is specified, and if the orientation of one direction is increased to solve this problem, the film is likely to be torn. In addition, since the film is poor in weather resistance, the film is unsuitable to be used outdoors.

In place of such polyethylene terephthalate films, polyethylene naphthalate films have been proposed. For example, Japanese Patent Laying-Open (KOKAI) No. 50-45877 (1975) discloses a biaxially oriented polyethylene 2,6-naphthalate film having a Young's modulus in the longitudinal direction of not less than 51,000 kg/cm$^2$, and a Young's modulus in the transverse direction of not less than 68,000 kg/cm$^2$, and which is useful as an electrical insulating material, a base material for magnetic recording tape. Japanese Patent Publication No. 56-19012 (1981) discloses a magnetic recording tape comprising a magnetic layer formed on the surface of a biaxially oriented polyethylene-2,6-naphthalate film which has a Young's modulus in the longitudinal direction of not less than 51,000 kg/cm$^2$ and a Young's modulus in the transverse direction of not less than 68,000 kg/cm$^2$ Japanese Patent Publication No. 48-29541 (1973) discloses a method of manufacturing a magnetic recording tape having a large tensile strength in the liongitudinal direction and a good dimensional stability, comprising a biaxially stretched polyethylene naphthalate film and a mixture of magnetic particles and a binder coated on the surface thereof.

However, no suggestion has ever been made as to the use of a uniaxially stretched polyethylene naphthalate film as a polarizing plate.

It is an object of the present invention to provide a film for polarizing plates which is superior in weather resistance, tear strength and heat resistance to a stretched polyethylene terephthalate film, and which produces no eduction of a low-molecular weight polymer such as an oligomer.

As a result of researches on how to achieve this aim, the present inventors have found that it is very difficult to obtain a film for polarizing plates having the above-described properties by using a polyethylene terephthalate film but it is enabled by using a polyethylene naphthalate film which is uniaxially highly oriented more than a predetermined value, and the present invention has been achieved on the basis of this finding.

SUMMARY OF THE INVENTION

In an aspect of the present invention, there is provided a uniaxially high-oriented polyethylene naphthalate film for polarizing plates which contains a dichroic dyestuff and has an in-plane birefringence of more than 0.110 after the film is stretched and subjected to heatset treatment.

DESCRIPTION OF THE PREFERRED EMBODIMENT

A polyethylene naphthalate used in the present invention represents a polymer constructed substantially ethylene-2,6-naphthalate as a constitutional unit and also includes an ethylene-2,6-naphthalate polymer modified with a third component in small amount of, for example, not more than 10 mol %, preferably not more than 5 mol %. polyethylene naphthalate is generally produced by polycondensating naphthalene-2,6-dicarboxylic acid or a functional derivative thereof, for example, dimethyl naphthalene-2,6-dicarboxylate with ethylene glycol in the presence of a catalyst under an appropriated reaction condition. As a third component, dicarboxylic acid such as adipic acid, sebacic acid, phthalic acid, isophthalic acid, terephthalic acid, naphthalene-2,7-dicarboxylic acid, and a lower alkyl ester thereof; hydroxycarboxylic acid such as p-hydroxybenzoic acid, and a lower alkyl ester thereof; and dihydric alcohol such as propylene glycol, trimethylene glycol, tetramethylene glycol, pentamethylene glycol and hexamethylene glycol may be exemplified.

The intrinsic viscosity of the polyethylene naphthalate used in the present invention is preferably at least 0.40, preferably 0.45 to 0.90, because the polyethylene naphthalate is poor in mechanical properties in the case where a polymerization degree is too low. [The method of measurement of intrinsic viscosity: 1 g of polyethylene naphthalate tip or film is added to 100 ml of phenol/1,1,2,2-tetrachloroethane (50/50 by weight) solution and the mixture is heated at 140° C. for 30 min., thereby dissolving the polyethylene naphthalate tip or film, and thereafter, an intrinsic viscosity is measured at 30.0° C.]

As the dichroic dyestuff contained in the polyethylene naphthalate according to the present invention, direct dyes and dispersion dyes may be mentioned [for instance, refer to Japanese Patent Application Laying-Open (KOKAI) No. 53-106743 (1978) and Japanese Patent Publication No. 49-3944 (1974)].

In addition, any dichroic substance such as Congo red, which exhibit dichroism in the case of being dyed or kneaded into a polymeric substance may be used for the prrpose of the present invention. The amount of addition of the dichroic dyestuff depends on the desired degree of polarization and the degree of coloring, and in general, is from 0.003 to 3% by weight, preferably from 0.01 to 1% by weight with respect to the polymeric substance.

As the representative of the dichroic dyestuff used in the present invention, the following anthraquinone dye and azo dyes are exemplified, however, it is not limited to the thus exemplified dyes. It is desired that the dichroic dyestuff is uniformly dispersed in polyethylene naphthalate.
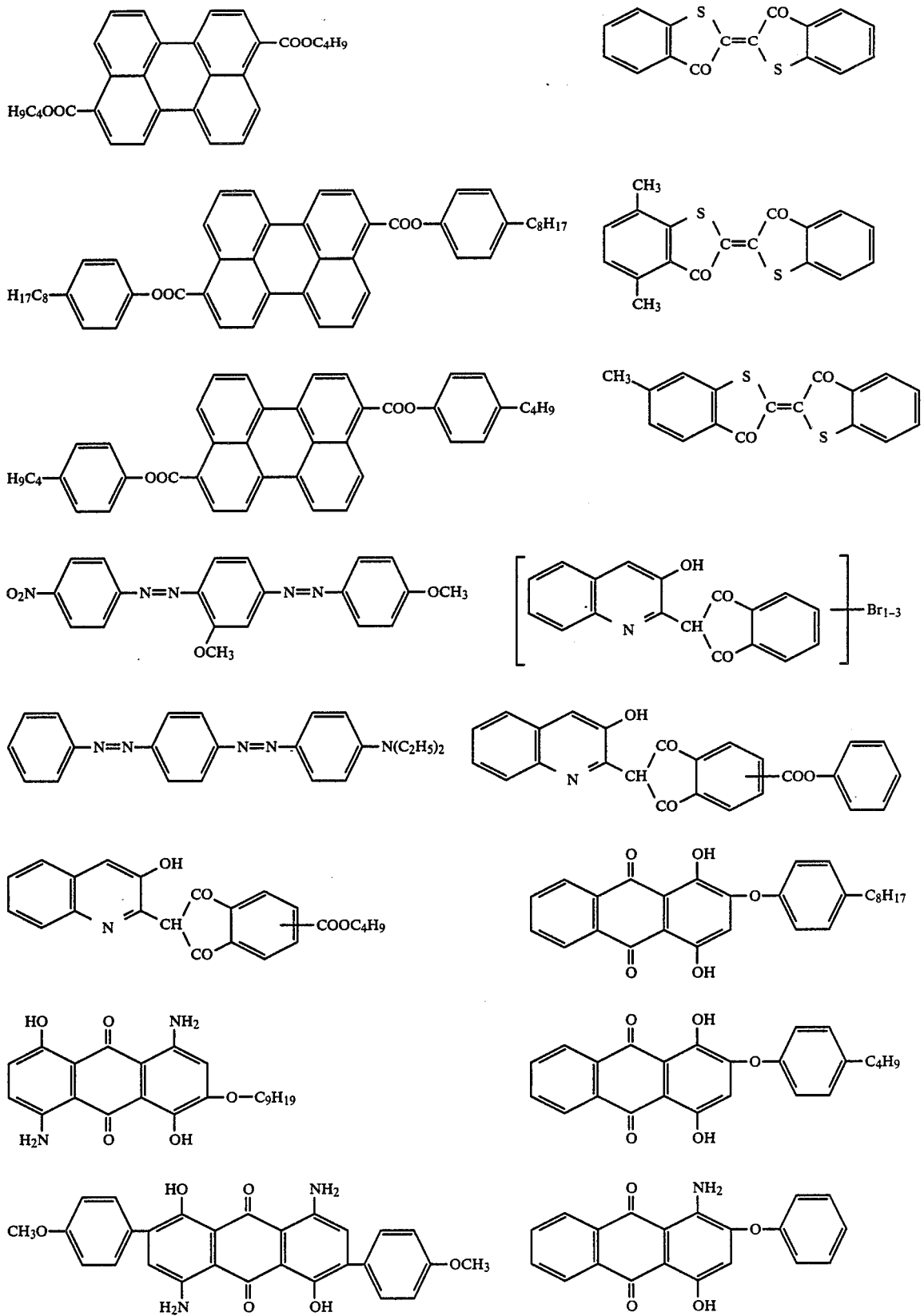

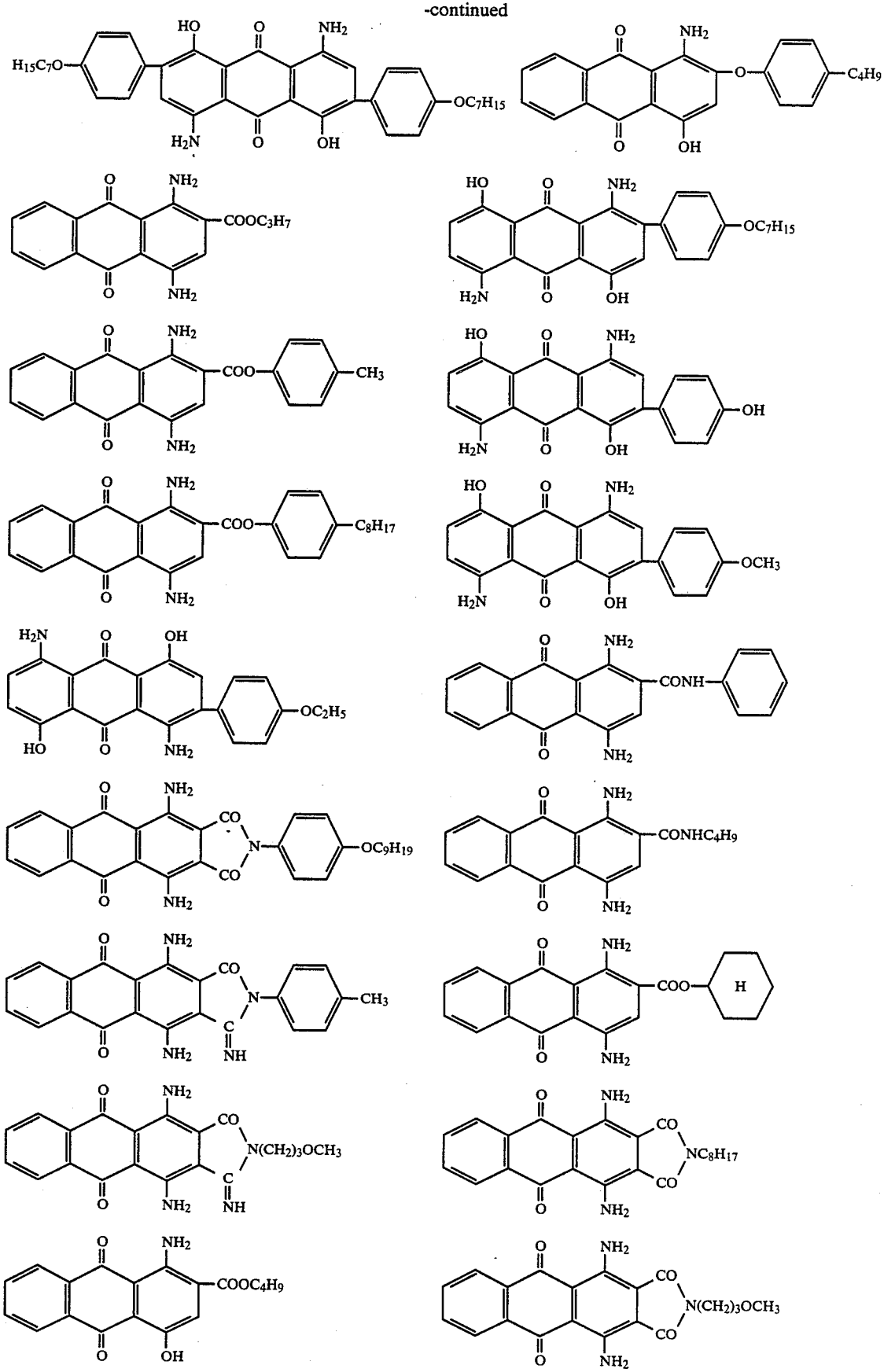

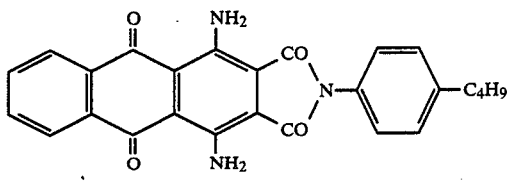
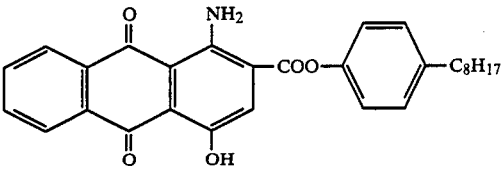
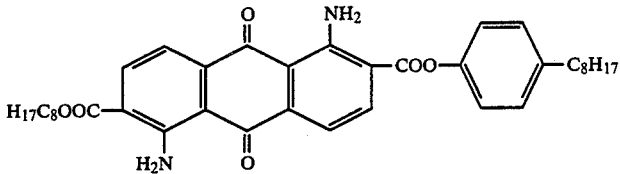

-continued

A film according to the present invention must have an in-plane birefringence of more than 0.110, preferably not less than 0.12, more preferably not less than 0.13, after the film is stretched and subjected to heatset treatment. If the in-plane birefringence of the film is not more than 0.110, when it is used as a polarizing plate the degree of polarization is unfavorably lowered.

When polyethylene terephthalate is used as a polarizing plate, since it is likely to be torn in the direction of stretching, a film having an in-plane birefringence of not more than 0.110 has been proposed. However, it has been unexpectedly found that if a polyethylene-2,6-naphthalate film is used, even if the in-plane birefringence is more than 0.110, it is difficult to tear. It is therefore possible to increase the in-plane birefringence thereof while maintaining the tear strength substantially the same as that of polyethylene terephthalate film. That is, a polyethylene-2,6-naphthalate film can improve the extinction of a polyethylene terephthalate film to a great extent.

It is necessary that the heat-shrinkage ratio both in the longitudinal and transverse directions of a film according to the present invention measured at 150° C. for 30 minutes is not greater than 2%. If the heat-shrinkage ratio is more than 2%, the film is shrunk when forming a conductive film, thereby deteriorating the flatness. In order to reduce the heat-shrinkage ratio, the film is subjected to relaxation in the longitudinal and/or transverse direction when it is stretched and subjected to heatset treatment, or the film is further subjected to heat treatment under a low tension after it has been rolled. It is also preferable to subject the film to heat treatment at a high temperature in order to reduce the heat-shrinkage ratio. A stretched polyethylene terephthalate film is difficult to subject to heat treatment at a high temperature because the haze is increased and the film is likely to be torn if the film is subject to heatset treatment at too high a temperature. It is advantageously possible, however, to subject a polyethylene naphthalate film to heatset treatment at a higher temperature, and the heatset treatment temperature is preferably 200° to 270° C.

Since a film according to the present invention must have transparency, it is necessary that the film haze is not more than 5% per with respect to a film of 100 μm in thickness. For this reason, the film of the present invention contains substantially no particles and, if any, it is necessary to limit the content of the particles to a certain extent which does not impair the rolling operability.

The thickness of a polyethylene naphthalate film according to the present invention is not specified, but the thickness of the film used usually is 10 to 250 μm.

A process for producing a film according to the present invention will now be explained, but the present invention is not limited thereto.

A polyethylene naphthalate polymer as a raw material is dried and extruded into a sheet form by an extruder ordinarily at a temperature of from 280° to 320° C. The extruded sheet is brought into contact with a cooling roll to be rapidly cooled and hardened, and is then uniaxially stretched and subjected to heatset treatment. When the molten polyethylene naphthalate sheet is brought into contact with the cooling roll, an electrostatic cooling method is preferably adopted so as to produce a film of good thickness accuracy at a high speed. Since it is difficult to apply the electrostatic cooling method to a polyethylene naphthalate which has a large resistivity in the molten state, it is preferable to use a polyethylene naphthalate which has a resistivity in the molten state of not more than $5\times10^8$ Ω·cm. The thus obtained sheet is then stretched by a roll in the longitudinal direction and hardly stretched in the transverse direction to obtain a longitudinally high-oriented film. Alternatively, the thus obtained sheet may hardly be stretched in the longitudinal direction and stretched in the transverse direction with high draw ratio to obtain a transversely high-oriented film. A longitudinally high-oriented film of the uniaxially high oriented films of the present invention is a film obtained by stretching a sheet in the longitudinal direction to 3 to 7 times and then in the transverse direction to less than 2.0 times. If the sheet is stretched in the longitudinal direction to less than 3 times or in the transverse direction to more than 2 times, it is impossible to highly orient the film in the longitudinal direction. A transversely high-oriented film of the uniaxially high-oriented films of the present invention is a film obtained by stretching a sheet in the longitudinal direction to less than the yield point and then in the transverse direction to more than 3.5 times. The thus stretched film is subject to heatset treatment by an ordinary tentering method or another known method. It is preferable to take the step of subjecting the film to relaxation at the maximum heatset temperature. It is also preferable to subject the film to heat treatment under a low tension at a high temperature when it has been rolled after being subjected to heatset treatment.

A uniaxially high-oriented polyethylene naphthalate film of the present invention obtained in the above-described has a much higher heat resistance than a polyethylene terephthalate film, produces no adhesion of a low-molecular weight substance such as an oligomer, is efficient in weather resistance, tear strength and degree of polarization.

The present invention will be explained in more detail hereinunder with reference to the following example, but the following example is for purpose of illustration only and is not intended as a definition of the limits of the invention. The physical properties were measured in the following way.

(1) Heat-shrinkage ratio

A test piece of 300 mm×15 mm was formed by cutting out of a film along the main axis thereof and in the orthogonal direction thereto, respectively. The test piece was suspended with one end clamped in a circular hot air oven which was held at 150° C., and heat treated for 30 minutes. The longitudinal dimensions of the test piece before and after the heat treatment were measured and the heat-shrinkage ratio was calculated from the following formula:

Heat-shrinkage ratio = [(length before the heat treatment − length after the heat treatment)/length before the heat treatment] × 100 (%).

(2) In-plane birefringence

The retardation was measured by a polarizing microscope produced by Karlzeis Ltd., and the in-plane birefringence ($\Delta n$) was obtained from the following formula:

$$(\Delta n) = R/d$$

wherein R represents retardation and d the thickness of the film.

(3) Mechanical Properties

The breaking strength ($F_B$:kg/mm$^2$) and the breaking extension ($E_B$:%) were obtained by an ordinary method by using Tensilon produced by Toyo Boldwin Ltd.

(4) Degree of polarization (%)

The degree of polarization was obtained from the ray transmittance (T$\parallel$) at the maximum absorption wavelength (640 nm) measured such that the stretching axes of two polarizing films were piled up in parallel to each other, and the ray transmittance (T$\perp$) at the maximum absorption wavelength measured such that the stretching axes of two polarizing films were piled up in orthogonal to each other, from the following formula:

$$\text{Degree of polarization} = \sqrt{\frac{T_\parallel - T_\perp}{T_\parallel + T_\perp}} \times 100.$$

EXAMPLE

Preparation of Polyethylene Naphthalate 100 parts of dimethyl naphthalate-2,6-dicarboxylate, 60 parts of ethylene glycol and 0.1 part of hydrous calcium acetate are charged into a reactor to carry out transesterification. The reaction initiating temperature was 180° C., and the reaction temperature was gradually raised with the distillation of methanol, until the temperature reached 230° C. after 4 hours, when the transesterification was substantially completed.

After 0.04 part of phosphoric acid was added to the reaction mixture, 0.04 part of antimony trioxide was added thereto to carry out polycondensation by an ordinary method in which the temperature was gradually raised and the pressure was gradually reduced from ordinary pressure, until the temperature reached 290° C. and the pressure 0.3 mmHg after 2 hours.

When 4 hours from the initiation of the reaction, the reaction was stopped and polyethylene naphthalate was discharged in a pressurized nitrogen.

The intrinsic viscosity of the thus obtained polyethylene naphthalate was 0.63, and the resistivity thereof in the molten state was $1.2 \times 10^8$ $\Omega$·cm.

Production of a Polyethylene Naphthalate Film

A polyester polymer in which dichroic blue disperse dye (Mikethren Blue-TGSF, produced by Mitsui Toatsu Chemicals Inc.) was uniformly blended with the thus obtained polyethylene naphthalate in a ratio of 0.5 g:1 kg was extruded at 295° C. by an extruder into a sheet form, and an amorphous sheet was formed by using an electrostatic cooling method.

The electrostatic charging was performed by applying a DC voltage of about 9 kV to the positive electrode, which is a tungsten wire of 0.1 mm in diameter, stretched over the rotating drum in the direction perpendicular to the flow of the sheet.

The thus obtained amorphous film was stretched in the longitudinal direction to 1.2 times and in the transverse direction to 4.2 times, and thereafter it was subjected to heatset treatment at 240° C. for 10 seconds. Further, in a zone at a temperature of 240° C., the thus obtained film was subject to relaxation in the transverse direction by 7%. This film was subjected to heat treatment at 170° C. for 7 seconds under a tension of 60 g/mm$^2$ in a hot-air oven conveying by a roll conveyor, whereby a transversely uniaxially stretched film was obtained.

COMPARATIVE EXAMPLE

A transversely uniaxially stretched polyethylene terephthalate film was produced by using the same dichroic blue disperse dye as that used in Example. A film for polarizing plates made of the thus-obtained polyethylene terephthalate film was used as Comparative Example.

TABLE 1

|  |  | Example | Comparative Example |
|---|---|---|---|
| In-Plane Birefringence |  | 0.135 | 0.150 |
| Heat-Shrinkage Ratio | Longitudinal Direction | 0.1 | 1.9 |
|  | Transverse Direction | 0 | 1.2 |
| Degree of Polarization |  | 71 | 63 |
| Mechanical Properties | $F_B$ (kg/mm$^2$) Longitudinal Direction | 15.0 | 5.0 |
|  | Transverse Direction | 25.0 | 23.0 |
|  | $E_B$ (%) Longitudinal Direction | 35 | 2 |
|  | Transverse Direction | 100 | 130 |

As is clear from Table 1, the film of the present invention is superior in heat resistance, heat shrinkage ratio, mechanical properties, and degree of polarization, as a polarizing plate. Although it is possible to enhance the degree of polarization of the polyethylene terephthalate film by further stretching it in the transverse direction, the mechanical properties thereof are so deteriorated as to be difficult to handle as a film roll. In other words, the mechanical properties and the degree of polarization are mutually contradictory characters, and a polyethylene naphthalate film is much superior in the balance between the mechanical properties and the degree of polarization to a polyethylene terephthalate film.

What is claimed is:

1. A uniaxially high-oriented polyethylene naphthalate film for polarizing plates containing a dichroic dyestuff, and having an in-plane birefringence of more than 0.110 after said film is stretched and subjected to heatset treatment.

2. The film according to claim 1, wherein the heat shrinkage ratio in the longitudinal direction and the transverse direction of said film measured after said film is subjected to heat treatment at 150° C. for 30 minutes is not more than 2%.

3. The film according to claim 1, wherein said film has a haze of not more than 5% with respect to a film of about 100 μm in thickness.

4. The film according to claim 1, wherein said film has a thickness of about 10 to 250 μm.

5. The film according to claim 1, wherein said dichroic dyestuff is an anthroquinone dye or an azo dye.

6. The film according to claim 1, wherein said dichroic dyestuff is selected from the group consisting of:

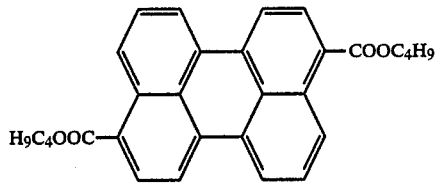

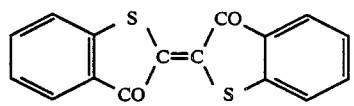

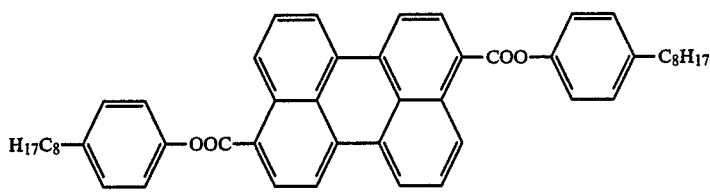

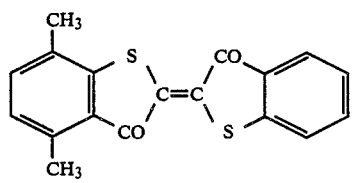

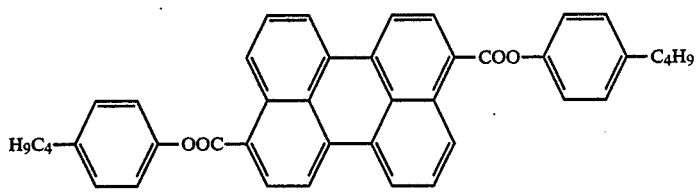

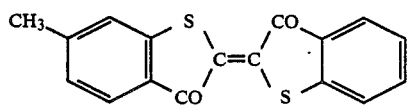

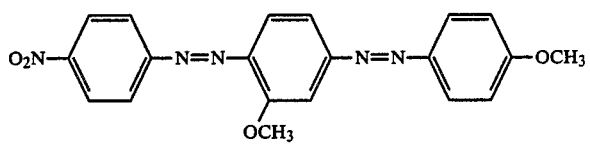

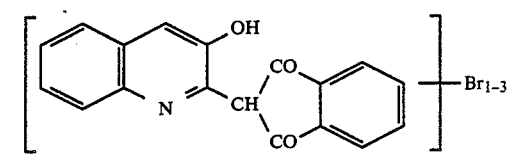

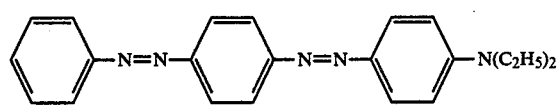

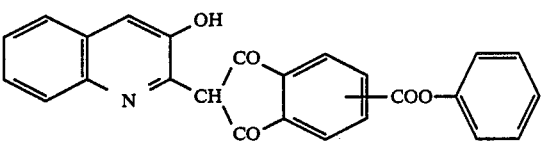

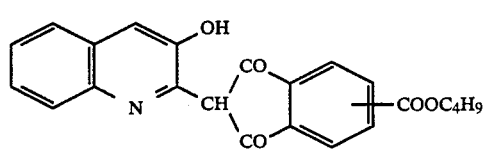

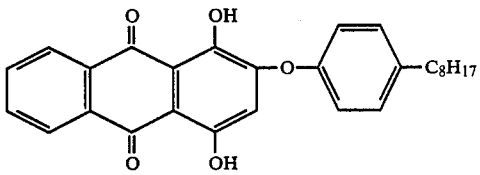

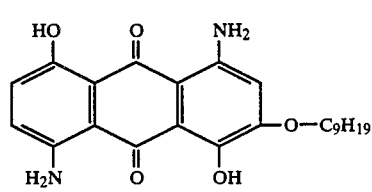

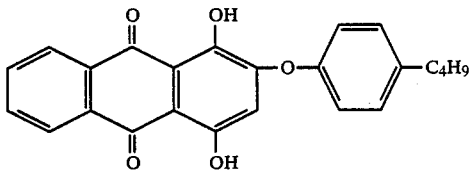

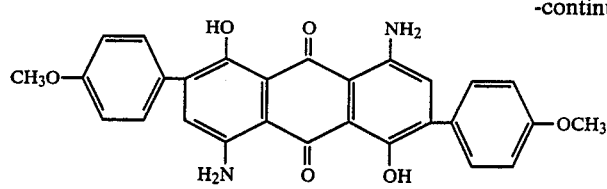
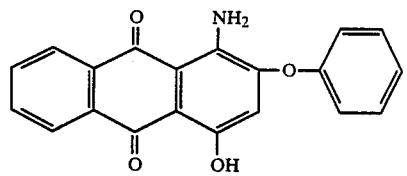
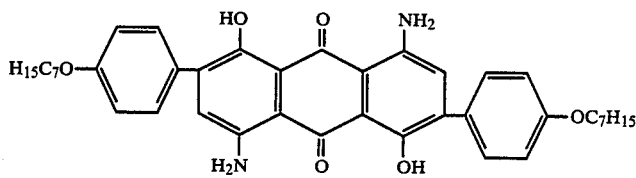
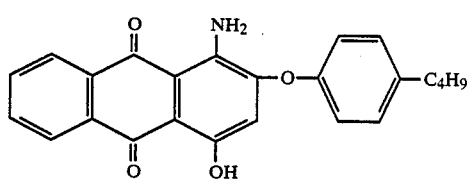
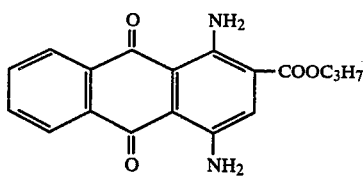
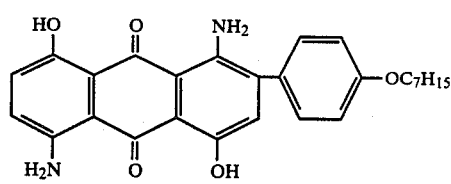
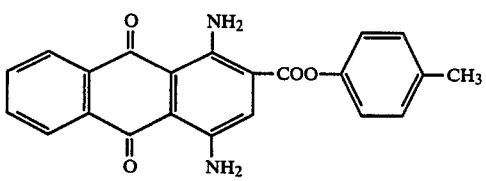
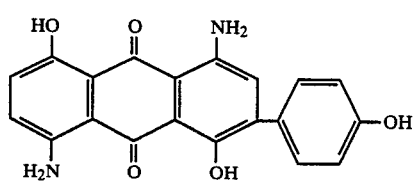
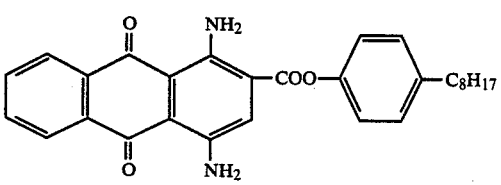
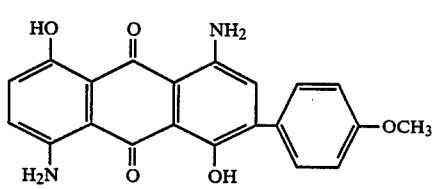
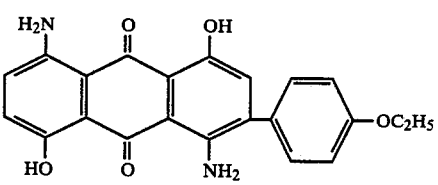
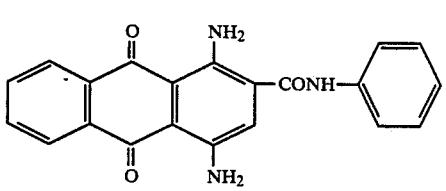
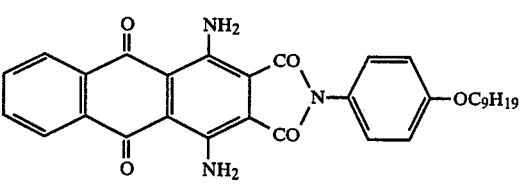
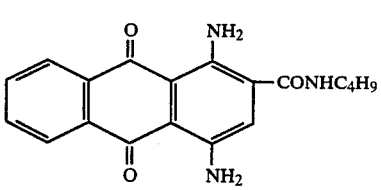
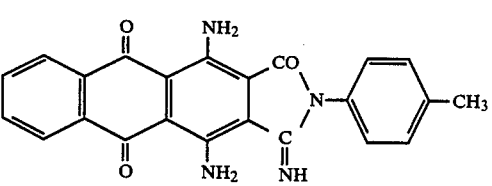
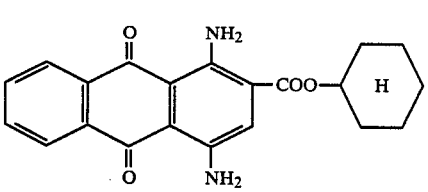
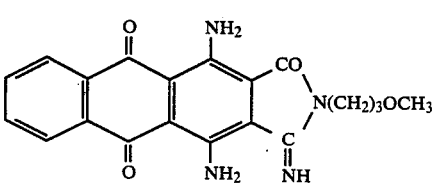
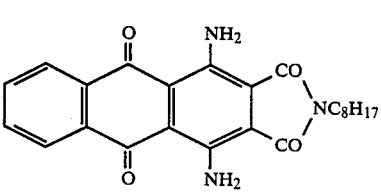

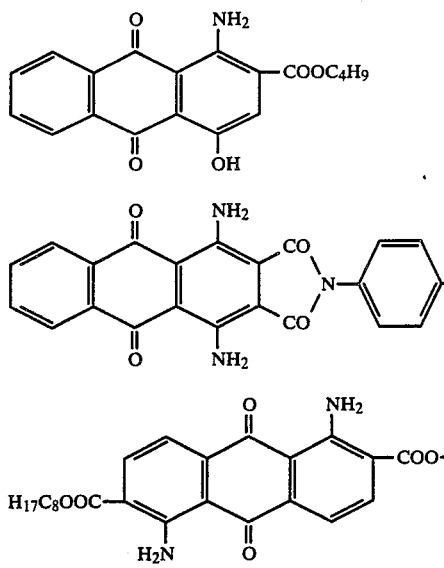
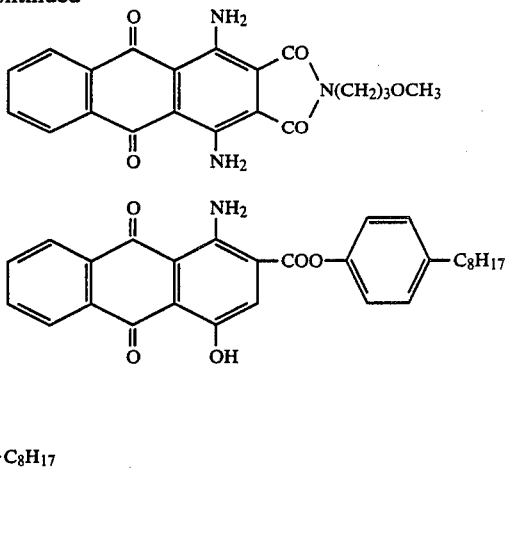

7. The film according to claim 1, wherein said polyethylene naphthalate is produced by polycondensing naphthalene-2,6-dicarboxylic acid or a methyl-substituted derivative thereof with ethylene glycol in the presence of a third component selected from the group consisting of adipic acid, sebacic acid, phthalic acid, isophthalic acid, terephthalic acid, naphthalene-2,7-dicarboxylic acid, and a lower alkyl ester thereof, p-hydroxybenzoic acid, and a lower alkyl ester thereof, propylene glycol, trimethylene glycol, tetramethylene glycol, pentamethylene glycol and hexamethylene glycol.

8. The film according to claim 1, wherein said polyethylene naphtalate has an intrinsic viscosity of at least 0.40.

9. The film according to claim 1, wherein the content of said dichroic dyestuff is 0.003 to 3% by weight with respect to polyethylene naphthalate.

10. The film according to claim 5, wherein said dichroic dyestuff is used in the amount of 0.01 to 1% by weight with respect to said polyethyelene naphthalate.

11. The film according to claim 1, wherein said film has an in-plane birefringence of not less than 0.12.

12. The film according to claim 11, wherein said film has an in-plane birefringence of not less than 0.13.

13. A polarizing plate comprising a uniaxially high-oriented polyethylene naphthalate film containing a dichroic dyestuff, having an in-plane birefringence of more than 0.110 after said film is stretched and subjected to heatset treatment.

* * * * *